US006814338B2

(12) United States Patent
Kajitani

(10) Patent No.: US 6,814,338 B2
(45) Date of Patent: Nov. 9, 2004

(54) TWO-PORT VACUUM VALVE CAPABLE OF ADJUSTING VALVE-OPENING

(75) Inventor: Masao Kajitani, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/407,430

(22) Filed: Apr. 7, 2003

(65) Prior Publication Data

US 2004/0007682 A1 Jan. 15, 2004

(30) Foreign Application Priority Data

Jul. 12, 2002 (JP) ........................................ 2002-204402

(51) Int. Cl.[7] ..................... F16K 31/143; F16K 31/163; F16K 31/363; F16K 31/383
(52) U.S. Cl. ..................... 251/63.6; 251/60; 251/285; 137/630
(58) Field of Search ........................ 251/60, 63.5, 63.6, 251/285; 137/630

(56) References Cited

U.S. PATENT DOCUMENTS 3,978,884 A * 9/1976 Sundstrom ................... 137/495
5,848,608 A * 12/1998 Ishigaki ................. 137/599.16
6,244,563 B1 * 6/2001 Ejiri ........................... 251/63.6

* cited by examiner

Primary Examiner—F. Daniel Lopez
Assistant Examiner—John K. Fristoe, Jr.
(74) Attorney, Agent, or Firm—Oblon, Spivak, McClelland, Maier & Neustadt, P.C.

(57) ABSTRACT

A first piston and a second piston are accommodated in a piston chamber of a cylinder. The first piston is connected to a main valve member which opens and closes a main flow passage. The second piston is connected to a second rod having a stopper whose position can be adjusted. Pressure fluid is supplied to the second pressure chamber to move the second piston forward to a position where the stopper abuts against the abutting portion. In this state, pressure fluid is supplied to the first pressure chamber to move the first piston to a position where the first piston abuts against the second piston, thereby opening the main valve member by a stroke of the first piston.

6 Claims, 4 Drawing Sheets

TWO-PORT VACUUM VALVE CAPABLE OF ADJUSTING VALVE-OPENING

TECHNICAL FIELD TO WHICH THE INVENTION BELONGS

The present invention relates to a two-port vacuum valve connected between a vacuum chamber and a vacuum pump for reducing a pressure in the vacuum chamber, and more particularly, to a two-port vacuum valve having function for adjusting a valve-opening.

PRIOR ART

In producing procedure of semiconductors, when a pressure in a vacuum chamber is reduced using a vacuum pump, a two-port vacuum valve is connected in a flow passage connecting a vacuum chamber and a vacuum pump, and a flow passage is opened and closed by the vacuum valve. In the vacuum valve used in such a manner, generally, a valve member which opens and closes the flow passage is driven by a piston, and a stroke of the piston corresponds to an opening of the valve member.

Depending upon various using conditions such as capacity of the vacuum chamber and pressure-reducing ability of the vacuum pump, the opening of the vacuum valve is not changed in accordance with the using conditions or the flow passage is not fully opened at a dash, and in many cases, it is required to divide the changing operation of the opening operation into a plurality of steps in such a manner that the flow passage is once opened in a limiting manner to carry out initial pressure reduction and then the flow passage is fully opened.

According to the conventional vacuum valve, however, since the stroke of the piston directly corresponds to the valve-opening as the above mention and the opening can not be adjusted, the above requirement can not be satisfied.

DISCLOSURE OF THE INVENTION

It is an object of the present invention to provide a two-port vacuum valve capable of adjusting valve-opening depending upon the using conditions and the like and having excellent function.

To achieve the above object, the present invention provides a two-port vacuum capable of adjusting the valve-opening comprising a valve housing having a first main port, a second main port to be connected to a vacuum chamber and a vacuum pump and a main flow passage which connects both the main ports with each other, a main valve member provided in the valve housing for opening and closing the main flow passage, a cylinder connected to the valve housing, a first piston and a second piston accommodated in a piston chamber of the cylinder such that these pistons can independently slide and abut against each other, a first pressure chamber formed between the first piston and a first end wall on the side of one end of the cylinder, and a second pressure chamber formed between the second piston and a second end wall on the side of the other end of the cylinder, a first operation port and a second operation port for respectively supplying pressure fluid to the first pressure chamber and the second pressure chamber, a first rod slidably passing through a first end wall of the cylinder and connecting the first piston and the main valve member with each other, a second rod slidably passing through a second end wall of the cylinder and having one end connected to the second piston and the other end extending outside of the cylinder, a positioning mechanism which comprises a stopper mounted to the second rod such that its position can be adjusted and an abutting portion against which the stopper abuts and stops, and which defines a forward movement position of the second piston, and a return spring for biasing the main valve member in its closing direction.

In the vacuum valve of the present invention having the above structure, if pressure fluid is supplied from the second operation port to the second pressure chamber, the second piston moves forward toward the first piston, the stopper stops at an intermediate position where the stopper abuts against the abutting portion. If pressure fluid is supplied from the first operation port to the first pressure chamber while keeping the pressurizing state of the second operation port, the first piston that has moves forward by the return spring retreats toward the second piston. Therefore, the main valve member opens, and the first piston opens the main flow passage by a stroke which is limited until the first piston abuts against the second piston. The valve-opening at that time can freely be adjusted by changing the position of the stopper along the second rod.

When the main valve member is to be further opened fully from the above state, if the second operation port is evacuated while keeping the pressurizing state of the first operation port, the first piston and the second piston retreat together, and the main valve member is fully opened.

According to the vacuum valve of the present invention, it is possible to adjust the valve-opening of the main valve member and to open the main valve member in two stages with simple means to define the stroke of the first piston which drive the main valve member by the second piston.

In the present invention, the piston chamber of the cylinder has uniform inner diameter entirely, the first piston and the second piston have the same diameters.

Further, it is preferable that surfaces of the first piston and the second piston which abut against each other are formed with projections and recesses which are fitted to each other at the time of abutment.

In the present invention, the vacuum valve may comprise an auxiliary valve mechanism which opens and closes the main flow passage in a limited manner. The auxiliary valve mechanism comprises an auxiliary flow passage formed such as to establish a short circuit in the main flow passage, an auxiliary valve member for opening and closing the auxiliary flow passage, an auxiliary piston slidably accommodated in the first piston, an auxiliary rod which is movably inserted into the first rod and which connects the auxiliary valve member and the auxiliary piston with each other, an auxiliary pressure chamber for applying fluid pressure to the auxiliary piston in a valve-opening direction, an auxiliary operation port for supplying pressure fluid to the auxiliary pressure chamber, and a return spring for biasing the auxiliary valve member in a valve-closing direction.

It is preferable that the auxiliary valve mechanism includes an adjusting shaft which adjust a valve-opening of the auxiliary valve member, the adjusting shaft slidably passes through the second rod and second piston and is thread-typed connected to the first piston, a tip end of the adjusting shaft abuts against a back surface of an auxiliary piston in the first piston, a stroke of the auxiliary piston can be adjusted by adjusting a connection position between the first piston and the adjusting shaft.

DETAILED DESCRIPTION

Figure 1:
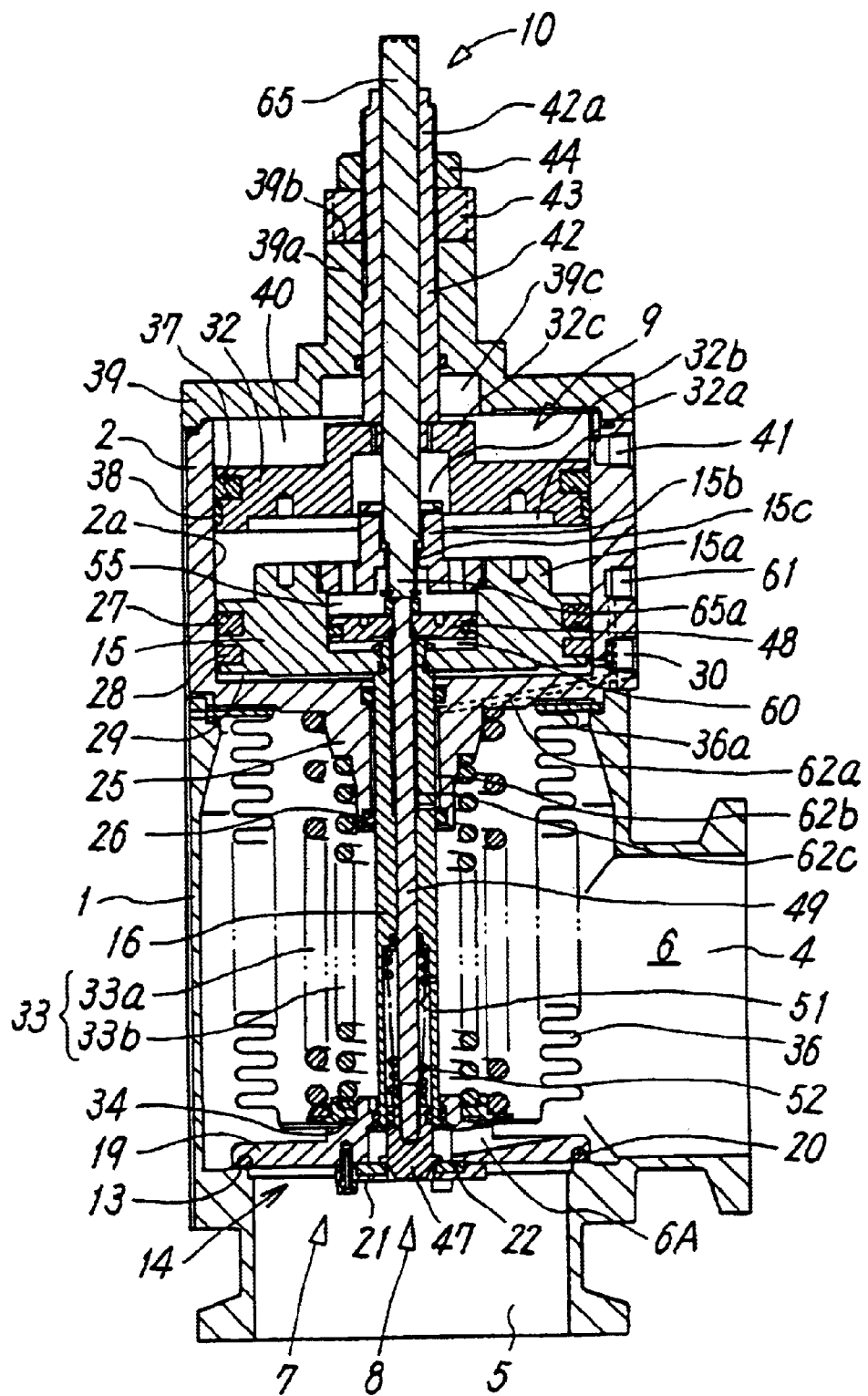
FIG. 1 is a sectional view showing an embodiment of a two-port vacuum valve according to the present invention.

The Drawings, FIGS. 1 to 4, show different operational states of a two-port vacuum valve according to the present invention. This vacuum valve has a cylindrical or polygonal cylindrical valve housing 1, and a cylinder 2 having the same shape as the valve housing 1 and connected to one axial end of the valve housing 1.

The valve housing 1 includes a first main port 4 to be connected to a vacuum chamber, a second main port 5 to be connected to a vacuum pump, and a main flow passage 6 for connecting both the main ports 4 and 5 to each other. Incorporated in the valve housing 1 are a main valve mechanism 7 for opening and closing the main flow passage 6, an auxiliary valve mechanism 8 for opening and closing an auxiliary flow passage 6A provided such as to establish a short circuit in the main flow passage 6, and first and second valve-opening adjusting mechanisms 9 and 10 for adjusting the valve-openings of the main valve mechanism 7 and the auxiliary valve mechanism 8. The two main ports 4 and 5 may be connected to any of the vacuum chamber and the vacuum pump.

The main valve mechanism 7 includes an annular main valve seat 13 formed in the main flow passage 6, a main valve member 14 for opening and closing the main valve seat 13, a first piston 15 which is slidably accommodated in a piston chamber 2a of the cylinder 2 and is actuated by fluid pressure to drive the main valve member 14, and a first rod 16 which connects the main valve member 14 and the first piston 15 to each other.

In the main valve member 14, an annular seal member 20 for opening and closing the main valve seat 13 is mounted to a front surface outer edge of a disk-like valve base plate 19. The valve base plate 19 is formed with the auxiliary flow passage 6A and an annular auxiliary valve seat 22. The auxiliary valve seat 22 is provided on an annular valve seat holder 21 fixed to a central portion of the front surface of the valve base plate 19 by a screw.

A tip end of the first rod 16 is air-tightly fitted into a central coupling hole of the valve base plate 19 through a seal member, and is fixed thereto by fixing means such as a retaining ring. A rear end of the first rod 16 slidably passes through a first end wall 25 which defines the valve housing 1 on the axially one end side of the cylinder 2, and projects into the piston chamber 2a in the cylinder 2, and is air-tightly connected to the first piston 15 which is slidably provided in the piston chamber 2a. In the drawing, a reference number represents a seal member which keeps the air-tightness between the first rod 16 and the first end wall 25.

The first piston 15 is provided at its outer periphery with a seal member 27 and a wearing ring 28 which air-tightly slide with respect to an inner wall of the piston chamber 2a. A first pressure chamber 29 is formed between the first piston 15 and the first end wall 25. The first pressure chamber 29 is in communication with a first operation port 30 formed in a side wall of the cylinder 2. Therefore, if pressure fluid such as compressed air is supplied from the first operation port 30 to the first pressure chamber 29, the first piston 15 is retreated toward the second piston 32 to retreat the main valve member 14 through the first rod 16. Therefore, the main valve member 14 is separated from the main valve seat 13 to open the main flow passage 6.

Provided in the valve housing 1 are a first return spring 33 comprising two coil springs 33a and 33b located between a spring receiving member 34 mounted to the valve base plate 19 of the main valve member 14 and a first end wall 25 of the cylinder 2 for resiliently biasing the main valve member 14 in its closing direction, and a bellows 36 including the first rod 16 and two springs between the main valve member 14 and a bellows holder 36a supported by the valve housing 1. From a state in which pressure fluid is supplied into the first pressure chamber 29 and the main valve member 14 is opened as described above, if the pressure fluid is discharged out, the main valve member 14 returns by the first return spring 33 and seats on the main valve seat 13 to close the main flow passage 6.

A first valve-opening adjusting mechanism 9 which adjusts the valve-opening of the main valve member 14 has the second piston 32 which is accommodated in the piston chamber 2a of the cylinder 2 such that the second piston 32 can slide with respect to the piston chamber 2a independently from the first piston 15 and can abut against the first piston 15. The second piston 32 is provided at its outer periphery with a seal member 37 and a wearing ring 38 which air-tightly slide with respect to the inner wall of the piston chamber 2a. A second pressure chamber 40 is formed between the second piston 32 and the second end wall 39 of the cylinder 2. The second pressure chamber 40 is in communication with a second operation port 41 formed in a side wall of the cylinder 2. If pressure fluid such as compressed air is supplied from the second operation port 41 to the second pressure chamber 40, the second piston 32 moves forward to a defined position toward the first piston 15, the second piston 32 functions as a stopper for receiving the first piston 15 at that position, thereby limiting a stroke of the first piston 15. The piston chamber 2a has uniform inner diameter over its entire length and thus, the first piston 15 and the second piston 32 have the same diameters.

To define the forward movement position of the second piston 32, a second rod 42 is connected to the second piston 32. The second rod 42 is of cylindrical shape, and the second rod 42 air-tightly and slidably passes through a cylindrical portion 39a formed in a second end wall 39 of the cylinder 2. A tip end of the second rod 42 extends into a second pressure chamber 40, and connected to a central portion of a back surface of the second piston 32, and an opposite side base end 42a of the second rod 42 extends outside of the cylinder 2. An outer periphery of a base end 42a of the second rod 42 is formed with a thread, and a nut-like stopper 43 is mounted to the thread portion located at an outer portion of the cylinder 2 such that the stopper 43 can be adjusted in position. On the other hand, an outer end of the cylindrical portion 39a of the second end wall 39 is formed with an abutting portion 39b against which the stopper 43 abuts and stops. If the second piston 32 moves forward by the fluid pressure as described above, the second rod 42 also moves forward together, the stopper 43 abuts against the abutting portion 39b and the second piston 32 stops at that position. Therefore, the stopper 43 and the abutting portion 39b form a positioning mechanism for defining the forward movement position of the second piston 32. In the drawing, a reference number 44 represents a lock nut for fixing the stopper 43.

Surfaces of the first piston 15 and the second piston 32 which abut against each other are formed with a projection and a recess which fitted to each other at the time of abutment. In the illustrated example, the first piston 15 is formed at its back surface with a large diameter first projection 15a and a small diameter second projection 15b projecting toward the second piston 32 in a two stepwise manner. The second piston 32 is formed at its front surface, in a two stepwise manner, with a large diameter first recess 32a and a small diameter second recess 32b to which the projections 15a and 15b are fitted. The second piston 32 is formed at its back surface with a projection 32c which projects toward the second end wall 39. The second end wall 39 is formed with a recess 39c into which the projection 32c is fitted at a retreating stroke end of the second piston 32.

On the other hand, the auxiliary valve mechanism 8 includes an auxiliary valve member 47 which opens and closes the auxiliary valve seat 22 in the auxiliary flow passage 6A provided in the main valve member 14, an auxiliary piston 48 which is actuated by the fluid pressure to drive the auxiliary valve member 47, and an auxiliary rod 49 which mutually connects the auxiliary valve member 47 and the auxiliary piston 48.

The auxiliary valve member 47 comprises a needle valve. The auxiliary valve member 47 is accommodated in a hollow portion 51 formed in a tip end of the first rod 16 such that the auxiliary valve member 47 is slidably air-tightly in a longitudinal direction in the hollow portion 51. A second return spring 52 comprising a coil spring is provided between the auxiliary valve member 47 and a spring seat of the first rod 16, and the valve is biased in its closing direction by the return spring 52. An opening diameter of the auxiliary valve seat 22 is naturally smaller than that of the main valve seat 13.

The auxiliary rod 49 is air-tightly and slidably inserted into the hollow first rod 16. A tip end of the auxiliary rod 49 is connected to the auxiliary valve member 47. A rear end of the first rod 16 projects into an auxiliary piston chamber 55 formed in the first piston 15, and is air-tightly connected to the auxiliary piston 48 which is slidably disposed in the auxiliary piston chamber 55.

The auxiliary piston 48 is provided at its outer periphery with a seal member. The auxiliary piston 48 air-tightly slides on an inner wall of the auxiliary piston chamber 55 through the seal member. The auxiliary piston 48 is formed at its front surface with an auxiliary pressure chamber 60 between the auxiliary piston 48 and the first piston 15. The auxiliary pressure chamber 60 and an auxiliary operation port 61 formed in a side surface of the cylinder 2 are in communication with each other through flow passages 62a to 62c. The flow passage portion 62a is of hole-like shape formed in the cylinder 2. The flow passage portion 62b is of annular shape formed between the first end wall 25 and an outer periphery of the first rod 16. The flow passage portion 62c is of annular shape formed between the first rod 16 and an outer periphery of the auxiliary rod 49. If pressure fluid is supplied from the auxiliary operation port 61 to the auxiliary pressure chamber 60, the auxiliary piston 48 retreats and the auxiliary valve member 47 is retreated through the auxiliary rod 49. Therefore, the auxiliary valve member 47 is separated from the auxiliary valve seat 22 to open the auxiliary flow passage 6A. If the pressure fluid in the auxiliary pressure chamber 60 is discharged out, the auxiliary valve member 47 moves forward by the resilient force of the second return spring 52 and abuts against the auxiliary valve seat 22 to close the auxiliary flow passage 6A.

A second valve-opening adjusting mechanism 10 for adjusting the valve-opening of the auxiliary valve member 47 includes an adjusting shaft 65 extending from the back surface of the auxiliary piston 48 in an opposite direction from the auxiliary rod 49. The adjusting shaft 65 is provided at its tip end with a small diameter screw portion 65a. The adjusting shaft 65 slidably passes through the second rod 42 and the second piston 32. The screw portion 65a is thread-typed connected to a thread hole 15c provided in the second projection 15b of the first piston 15, and a tip end thereof extends into the auxiliary piston chamber 55 and abuts against the back surface of the auxiliary piston 48. By rotating the adjusting shaft 65 to adjust the connection positional relation with respect to the first piston 15, a stroke of the auxiliary piston 48 can be adjusted.

In the vacuum valve having the above-described structure, before a pressure in the vacuum chamber is reduced, if no pressure fluid is supplied to the first and second operation ports 30 and 41, as well as the auxiliary operation port 61, the main valve member 14 and the auxiliary valve member 47 are moved to their closing positions by the resilient forces of the first return spring 33 and the second return spring 52, and if the main valve seat 13 and the auxiliary valve seat 22 abut against each other, the main flow passage 6 and the auxiliary flow passage 6A are closed.

Here, if pressure fluid is supplied from the second operation port 41 into the second pressure chamber 40, the second piston 32 and the second rod 42 moves forward as shown in FIG. 1, the second piston 32 moves to and stops at a position where the stopper 43 on the second rod 42 abuts against the abutting portion 39b.

Figure 2:
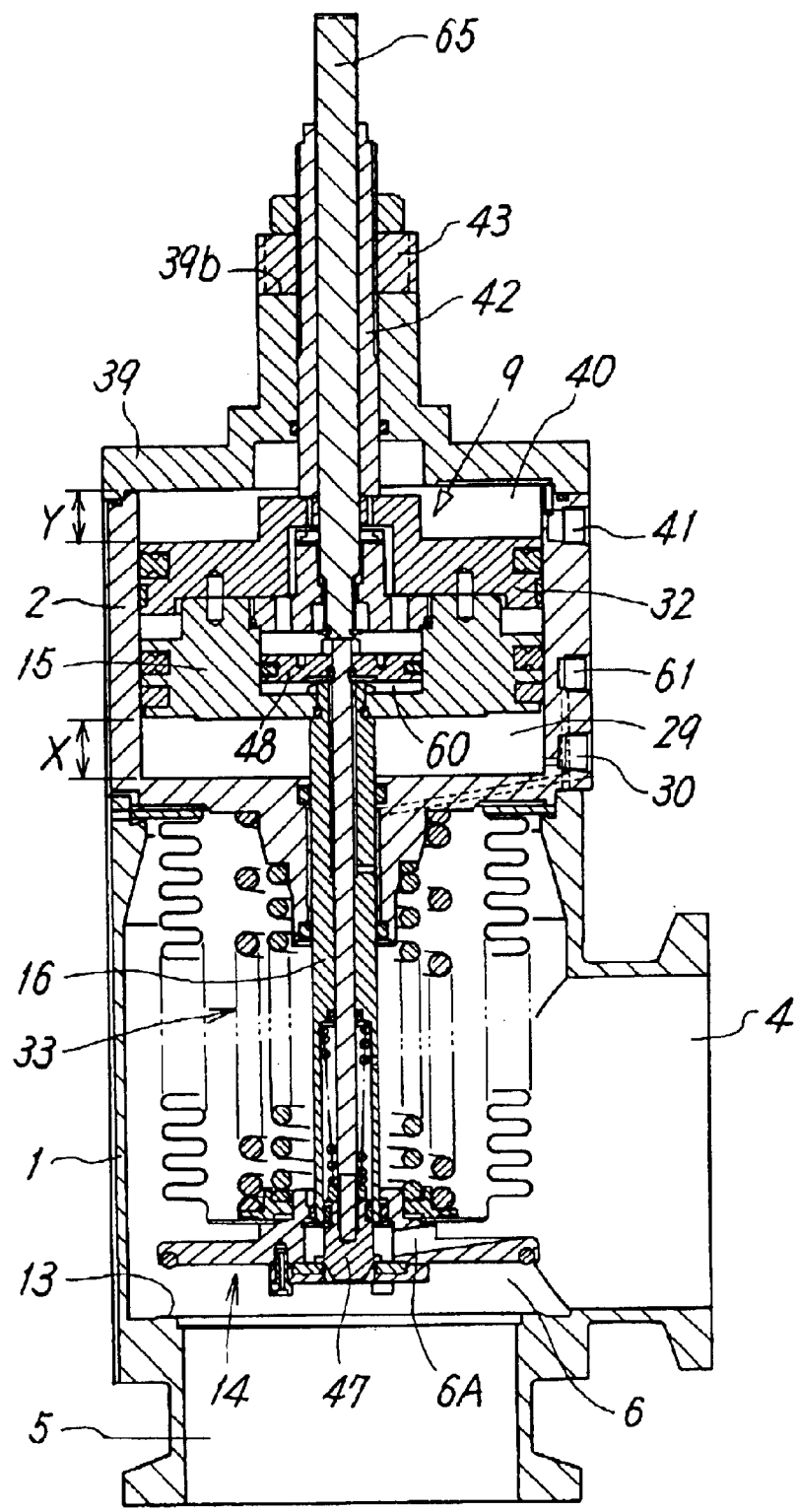
FIG. 2 is a sectional view showing a different operational state of the vacuum valve shown in FIG. 1.

Next, if pressure fluid is supplied from the first operation port 30 to the first pressure chamber 29 as shown in FIG. 2 while keeping pressurizing the second operation port 41, the first piston 15 retreats toward the second piston 32 against the resilient force of the first return spring 33 through a distance X as a stroke, and the first piston 15 stops at a position where the first piston 15 abuts against the second piston 32. With this motion, the main valve member 14 is also retreated and separated from the main valve seat 13, the main flow passage 6 is opened by the limited stroke X of the first piston 15 in a limited manner, and the vacuum chamber is reduced in pressure by the vacuum pump. At that time, the first piston 32 is in abutment against the second piston by a force obtained by subtracting an opposite force generated by the first return spring 33 from a force generated by the fluid pressure in the first pressure chamber 29. Since this force obtained by the subtraction is smaller than the force of the fluid pressure acting on the second piston, the second piston 32 is not pushed by the first piston 15 and retreated.

If the vacuum chamber is reduced in pressure to a predetermined vacuum pressure and the first operation port 30 is opened to discharge the pressure fluid in the first pressure chamber 29, the main valve member 14 is returned by the first return spring 33 as shown in FIG. 1, and the main valve member 14 seats on the main valve seat 13 to close the main flow passage 6.

In this manner, the second operation port 41 is brought into the pressurized state, the second piston 32 is stopped at the defined position and in this state, if the pressure fluid is supplied or discharged from the first operation port 30 to the first pressure chamber 29 to open or close the main valve member 14, the main flow passage 6 can be opened and closed in the limiting manner, and it is possible to adjust the conductance such that it becomes smaller than that when the vacuum valve is fully opened. The stopping position of the second piston 32 can freely be adjusted by adjusting a position of the stopper 43 on the second rod 42. With this, the opening amount of the main valve member 14, i.e., the valve-opening of the main valve member 14 is adjusted.

Figure 3:
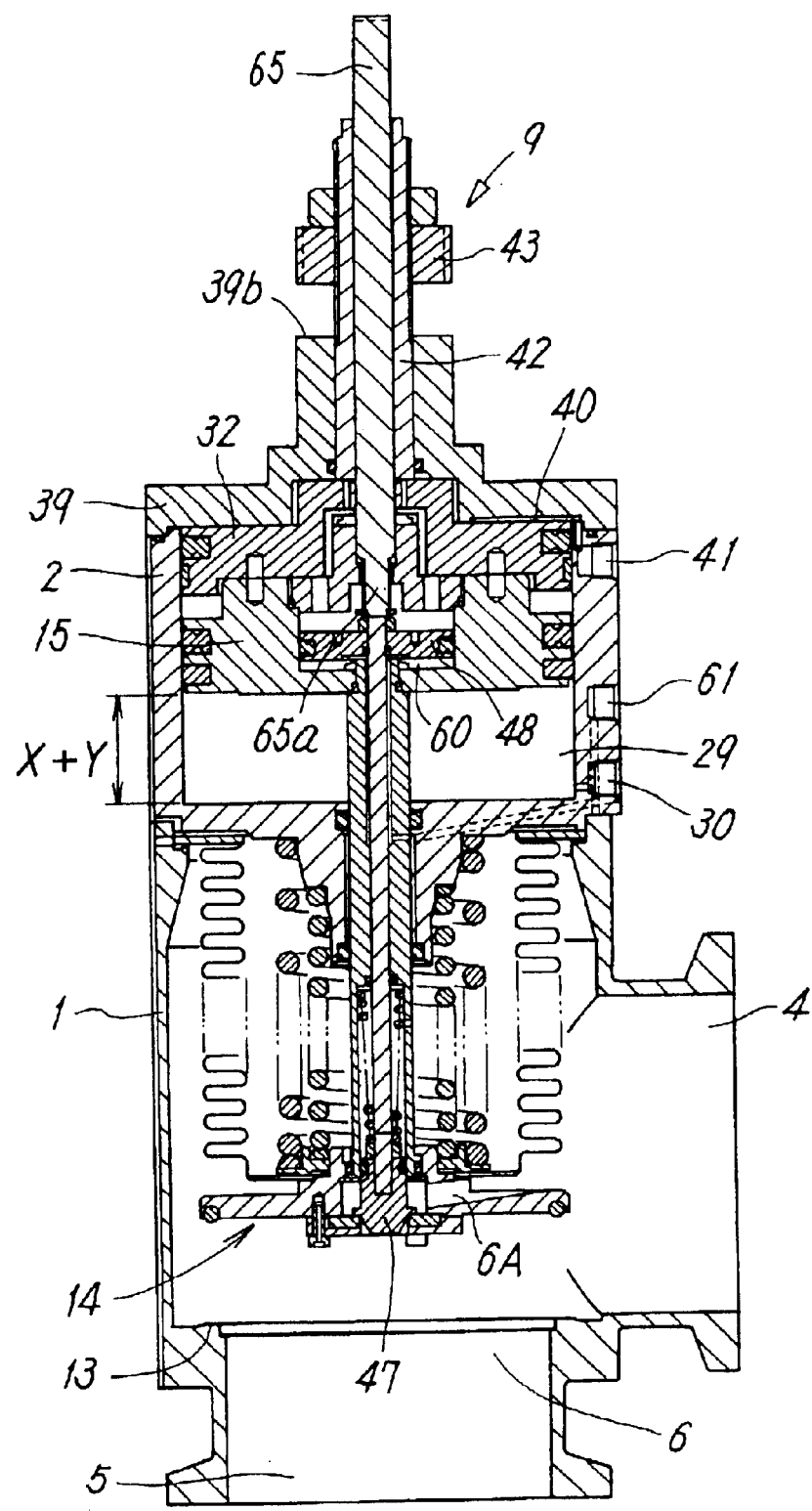
FIG. 3 is a sectional view showing another operational state of the vacuum valve shown in FIG. 1.

When the opening state of the main flow passage 6 is to be controlled in the two stepwise manner, i.e., the limited opening state and the fully opened state, the second operation port 41 is opened as shown in FIG. 3 from a state in which the main flow passage 6 is opened in the limited manner as shown in FIG. 2, and pressure fluid in the second pressure chamber 40 is discharged. With this arrangement, since the second piston 32 is retreated by the first piston 15, the main valve member 14 further moves through a distance Y (see FIG. 2) and the main flow passage 6 is fully opened.

Figure 4:
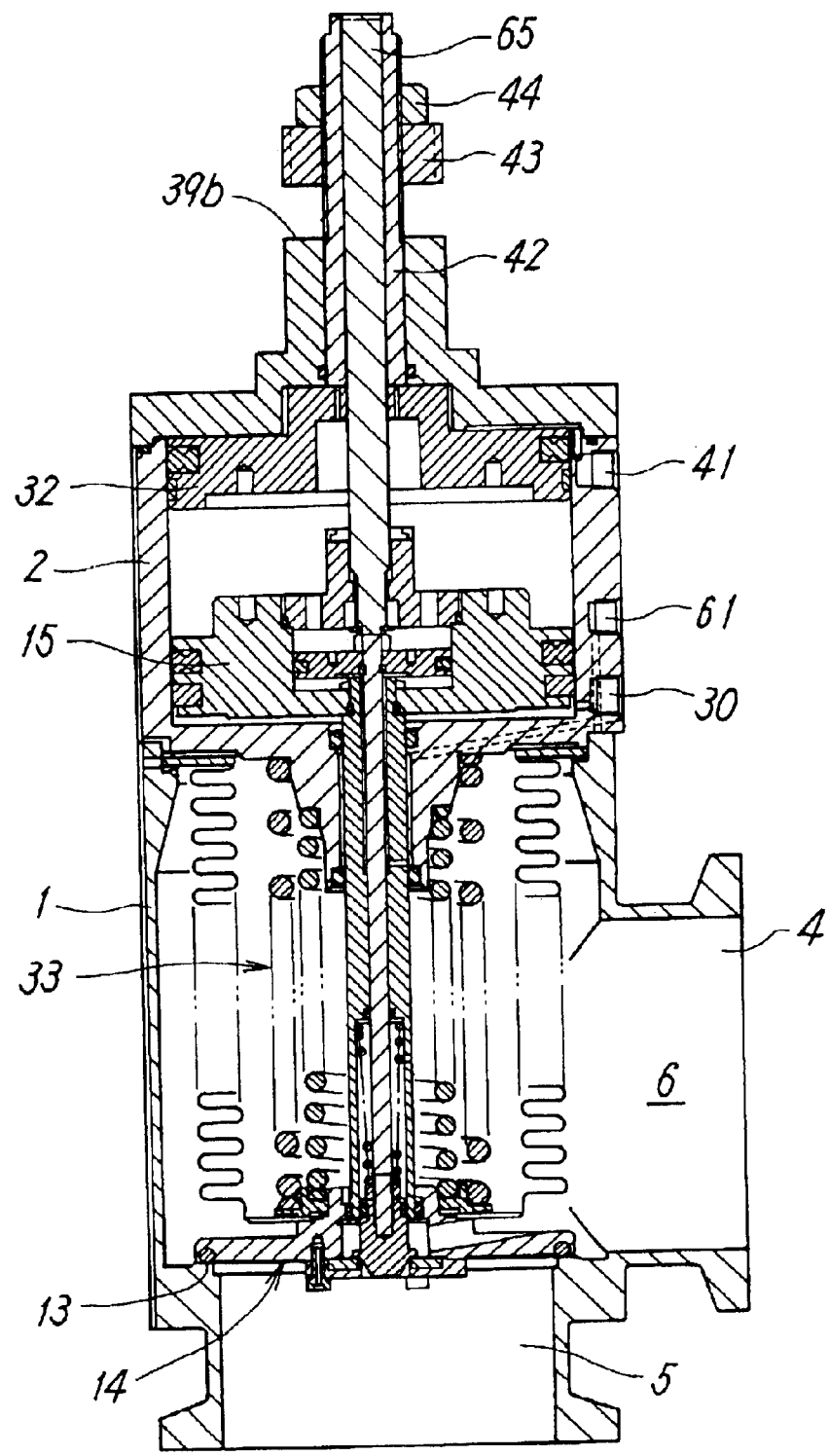
FIG. 4 is a sectional view showing further another operational state of the vacuum valve shown in FIG. 1.

If the first operation port 30 is opened from this fully opened state and the pressure fluid in the first pressure chamber 29 is discharged, the main valve member 14 returns by the first return spring 33 and seats on the main valve seat 13 to close the main flow passage 6 as shown in FIG. 4.

With this, it is possible to obtain the vacuum valve having conductance which changes in the two stepwise manners.

On the other hand, if the auxiliary flow passage 6A is initially opened by the auxiliary valve mechanism 8 before the main flow passage 6 is opened by the main valve mechanism 7 as described above, it is possible to evacuate the vacuum chamber slowly. That is, if the pressure fluid is supplied into the auxiliary pressure chamber 60 through the auxiliary operation port 61 from the state shown in FIG. 1, since the auxiliary piston 48 is actuated to separate the auxiliary valve member 47 from the auxiliary valve seat 22 through the auxiliary rod 49, the auxiliary flow passage 6A is opened. With this, gas in the vacuum chamber is gradually discharged through the auxiliary flow passage 6A which is opened in the limited manner, and the vacuum chamber is evacuated slowly.

The stroke of the auxiliary piston 48, i.e., the opening amount of the auxiliary valve member 47 can be freely adjusted by rotating the adjusting shaft 65 to move the shaft 65 forward or backward with respect to the first piston 15, and by adjusting the projecting amount of the adjusting shaft 65 into the auxiliary piston 48.

If the pressure in the vacuum chamber is initially reduced by the auxiliary valve mechanism 8 to a necessary pressure, the main valve mechanism 7 is actuated as described above, the main valve member 14 opens the main flow passage 6 and the remaining gas is discharged. At that time, the main valve member 14 may be opened in the limited manner by the stroke X or may be opened by the strokes X+Y in two states, i.e., the limited opened state and the fully opened state. In the case of the latter state in which the main valve member 14 is opened in two stages, it is possible to obtain a vacuum valve having conductance which changes in three stages by the main valve mechanism 7 and the auxiliary valve mechanism 8.

If the vacuum chamber is reduced in pressure into a predetermined vacuum pressure, the operation ports 30, 41 and 61 are opened, the main valve member 14 and the auxiliary valve member 47 are returned to close the main flow passage 6 and the auxiliary flow passage 6A, respectively.

If only the main valve mechanism 7 is used and there is no need to use the auxiliary valve mechanism 8, the auxiliary valve mechanism 8 and the second valve-opening adjusting mechanism 10 can be omitted. That is, the vacuum valve may not have the auxiliary valve mechanism 8, the second valve-opening adjusting mechanism 10 and a structure related to these mechanisms.

According to the present invention, it is possible to freely adjust the valve-opening depending upon the using conditions and the like, and to obtain a two-port vacuum valve having excellent function.

What is claimed is:

1. A two-port vacuum valve capable of adjusting valve-opening comprising:
    a valve housing having a first main port, a second main port and a main flow passage which connects both said main ports with each other,
    a main valve member provided in said valve housing for opening and closing said main flow passage,
    a cylinder connected to said valve housing,
    a first piston and a second piston accommodated in a piston chamber of said cylinder such that these pistons can independently slide and abut against each other,
    a first pressure chamber formed between said first piston and a first end wall on the side of one end of said cylinder, and a second pressure chamber formed between said second piston and a second end wall on the side of the other end of said cylinder,
    a first operation port and a second operation port for respectively supplying pressure fluid to said first pressure chamber and said second pressure chamber,
    a first rod slidably passing through a first end wall of said cylinder and connecting said first piston and said main valve member with each other,
    a second rod slidably passing through a second end wall of said cylinder and having one end connected to said second piston and the other end extending outside of said cylinder,
    a positioning mechanism which comprises a stopper mounted to said second rod such that its position can be adjusted and an abutting portion against which said stopper abuts and stops, and which defines a forward movement position of said second piston, and
    a return spring for biasing said main valve member in its closing direction.

2. A two-port vacuum valve according to claim 1, wherein said piston chamber of said cylinder has uniform inner diameter entirely, said first piston and said second piston have the same diameters.

3. A two-port vacuum valve according to claim 1 or 2, wherein surfaces of said first piston and said second piston which abut against each other are formed with projections and recesses which are fitted to each other at the time of abutment.

4. A two-port vacuum valve according to claim 1 or 2, further comprising an auxiliary valve mechanism which opens and closes said main flow passage in a limited manner.

5. A two-port vacuum valve according to claim 4, wherein said auxiliary valve mechanism comprises an auxiliary flow passage formed such as to establish a short circuit in said main flow passage, an auxiliary valve member for opening and closing said auxiliary flow passage, an auxiliary piston slidably accommodated in said first piston, an auxiliary rod which is movably inserted into said first rod and which connects said auxiliary valve member and said auxiliary piston with each other, an auxiliary pressure chamber for applying fluid pressure to said auxiliary piston in a valve-opening direction, an auxiliary operation port for supplying pressure fluid to said auxiliary pressure chamber, and a return spring for biasing said auxiliary valve member in a valve-closing direction.

6. A two-port vacuum valve according to claim 5, wherein said auxiliary valve mechanism includes an adjusting shaft which adjust a valve-opening of said auxiliary valve member, said adjusting shaft slidably passes through said second rod and second piston and is thread-typed connected to said first piston, a tip end of said adjusting shaft abuts against a back surface of an auxiliary piston in said first piston, a stroke of said auxiliary piston can be adjusted by adjusting a connection position between said first piston and said adjusting shaft.

* * * * *